3,331,825
POLYTETRAFLUOROETHYLENE MOLDING POWDERS
Kenichi Tominaga, Higashi-Yodogawa-ku, Osaka, and Kunio Mizushima, Takatsuki-shi, Osaka-fu, Japan, assignors, by mesne assignments, to Thiokol Chemical Corporation, Trenton, N.J., a corporation of Delaware
No Drawing. Filed Nov. 5, 1963, Ser. No. 321,414
5 Claims. (Cl. 260—92.1)

ABSTRACT OF THE DISCLOSURE

By uniformly rotating and vibrating polytetrafluoroethylene powders in suitable equipment for a sufficient period of time, it is possible (a) to smooth the particle surfaces without substantially decreasing the particle size, (b) to increase the bulk density of the powder, and (c) to increase its fluidity, thereby improving the resistance to coalescence of the powder. Four examples are given to show the effect of such rotational and vibrational treatment on the bulk density and powder fluidity of polytetrafluoroethylene molding powders. A new standard test, the Daikin Kogyo Powder Fluidity Test, has been devised as a measure of the fluidity of polytetrafluoroethylene powders.

---

This invention relates to polytetrafluoroethylene molding powders and, more particularly, to a method for improving the resistance to coalescence of polytetrafluoroethylene molding powders.

Polytetrafluoroethylene molding powders, which are generally produced by the suspension polymerization of tetrafluoroethylene in an aqueous medium containing a peroxide or persulfate (or similar) redox catalyst system, are molded commercially by fabrication techniques which were adapted from powder metallurgy and in which the polytetrafluoroethylene molding powder is usually cold-pressed into a preform under high pressures and the preformed article then sintered at temperatures at or above the fusion temperature of the molding powder to produce the molded article.

Because polytetrafluoroethylene polymer particles prepared as described above are coarse and uneven in shape, the particles must be pulverized in a wet or dry atmosphere to be of use for molding. Large particle size powders cause voids in molded articles, and reduce their electrical and physical properties, as such particles are difficult to cause to coalesce together in a void-free structure.

In order to minimize the occurrence of voids, it is necessary to pulverize the polytetrafluoroethylene particles to 10–400 mesh. In doing so, shear action on the particles should be avoided. Nonetheless, whatever pulverizers may be used, polytetrafluoroethylene particles do undergo shearing owing to the properties of the particles themselves, and so-called split feathers are observed on the surfaces of the pulverized particles under microscopic examination. The finer the particles, the more fibrous they appear.

Split feathers on the particle surfaces, or fibrous particles, reduce the powder fluidity, and further cause a tendency towards agglomeration of the particle in packages during transportation so that the powder must be deagglomerated for use or, in the worst case, is unsuitable for molding. Thus, in general the pulverization of polytetrafluoroethylene particles improves their properties for making molded articles but degrades the properties of the bulk powder.

An object of the present invention is to improve the bulk properties of polytetrafluoroethylene powder prepared by the pulverization etc. which has poor fluidity and a low bulk density, without degradation of its molding properties.

By uniformly rotating and vibrating polytetrafluoroethylene powders in a rotary mixer, we have found that it is possible to increase the bulk density and fluidity of the powder, thereby improving the resistance of the powder to coalescence.

Accordingly, the invention provides an improved method for improving the resistance to coalescence of polytetrafluoroethylene molding powders which comprises uniformly rotating and vibrating a polytetrafluoroethylene powder in a rotary mixer (or other similar blender or mill) to increase the bulk density and fluidity of the powder, thereby improving the resistance to coalescence of the powder. By uniformly rotating and vibrating the polytetrafluoroethylene powder in suitable equipment, it is possible to impart uniform frictional and impact motion to the powder particles, which uniform motion is believed to result in the increase in bulk density and fluidity of the powder such that the powder becomes resistant to coalescence.

For the purposes of the invention, any conventional blender or mixer may be used, the sole criterion being that the equipment be suitable to impart uniform frictional and impact motion to the polytetrafluoroethylene powder. For example, suitable equipment includes rotary ball mills, cylindrical and inclined cylindrical mixers, rotary mixers (including V-shaped, cone-shaped and double-cone-shaped rotary mixers), ribbon and screw type stationary mixers, kneader and edge runner type blenders, and tumbling type mixers. Consequently, as used herein, the term "rotary mixer" includes all of the foregoing equipment in which the polytetrafluoroethylene powder may be subjected to uniform frictional and impacted forces which are due to friction between the powder particles and to friction and impact between the powder particles and the interior walls of the equipment. Milling balls may be used in such equipment to impart additional frictional and impact forces to the powder particles.

To improve the resistance to coalescence of polytetrafluoroethylene powders in accordance with the invention, a conventional polytetrafluoroethylene powder (10 to 400 mesh) is charged to a rotary mixer (or to one of the aforementioned mixers or blenders) which is then rotated or vibrated at a uniform speed so that the combined frictional and impact motion imparted to the powder particles is uniform, which action, in turn eliminates any stickiness in the powder and smooths the particle surfaces. Depending on the size or shape of the powder particles, such uniform frictional and impact motion imparted to the surface of the particles rounds the split feather configurations and conditions the particles against agglomeration by smoothing the particle surface. As a result, the bulk density and fluidity of the powder are improved. Also the particle size is increased somewhat, depending upon the powder properties. As the energy imparted to the powder by frictional and impact motion is small, structural properties of the powder are not adversely influenced.

If, on the other hand, the polytetrafluoroethylene powder is non-uniformly rotated and vibrated in the equipment, the powder becomes somewhat fluffy and the tendency of the powder to agglomerate increases rather than decreases.

Treatment of the polytetrafluoroethylene powder in accordance with invention should be accomplished at a temperature in the range between about $-10°$ C. to about $100°$ C., temperatures lower than about $-10°$ C. being impractical while temperatures substantially higher than about $100°$ C. tend to promote stickiness of the powder and thus to increase the tendency of the powder to agglomerate. Temperatures in the range from 10° C. to 40° C. are advantageous. The time required to treat the powder depends, of course, on the particle size, capacity of the rotary equipment, whether or not milling balls are used, and the operating temperature. In general, treatment of the powder from 1 to 3 hours is sufficient to markedly increase its bulk density and fluidity and thereby improve its resistance to coalescence. The specific properties of the improved powder prepared in accordance with the present invention depend on the properties of original untreated powder, the mixer used, and the treating time and treating temperature. In general, untreated powder having a bulk density in the range from 0.15 to 0.9 g./cc. is increased by 0.02 to 0.40 g./cc. and powder fluidity is markedly increased over that of the untreated powder.

The following examples are illustrative of the effectiveness by which polytetrafluoroethylene powders may be treated to increase their bulk density and fluidity and thereby improve their resistance to coalescence in accordance with the invention:

*Example I*

Fourteen kilograms of a polytetrafluoroethylene powder having a particle size between 40 and 400 mesh (Tyler standard) and a bulk density of 0.22 gram per cubic centimeter were separated into two equal portions of 7 kilograms and each portion then separately blended in a 100 liter stainless steel V-shape blender operated at 15 r.p.m. and at 10° C., the first portion being rotated for 1 hour and the second for 2 hours, respectively.

Upon removal of each sample of powder from the blender, its bulk density and powder fluidity were determined.

*Example II*

Ten kilograms of a polytetrafluoroethylene powder having a particle size between 40 and 300 mesh (Tyler standard) and a bulk density of 0.25 gram per cubic centimeter were separated into two equal portions of 5 kilograms and each sample then separately added to a ceramic ball mill together with 20 ceramic balls having a diameter of 25 millimeters. After rotating the ceramic ball mill at 7 r.p.m. for a period of 1 hour for one sample and 2 hours for the second, both at room temperature, the powder samples were removed from the mill and their bulk density and fluidity determined.

*Example III*

Twenty kilograms of polytetrafluoroethylene powder having a particle size between 10–250 mesh (Tyler standard) and a bulk density of 0.44 gram per cubic centimeter were added to a 100 liter stainless steel V-shape blender with agitating wing and the powder blended at room temperature for 2 hours at a wing rotation of 700 r.p.m. in counter direction to the blender rotation at 20 r.p.m., following which the powder was removed from blender.

For the purposes of comparison, another 20 kilograms sample of the same polytetrafluoroethylene powder was blended under identical conditions, except that blending was continued only for 1 hour instead of 2 hours. In both instances, the bulk density and powder fluidity of each sample was determined.

*Example IV*

Twenty-five kilograms of polytetrafluoroethylene powder having a particle size between 10 and 250 mesh (Tyler standard) and a bulk density of 0.60 gram per cubic centimeter were added to a 100 liter ribbon mixer and the powder mixed at room temperature for 2 hours at a blade rotation of 15 r.p.m., following which it was removed from the mixer. For the purpose of comparison, another 25 kilograms sample of the same polytetrafluoroethylene powder was mixed under identical conditions, except that mixing was continued only for 1 hour instead of 2 hours.

In both instances, the bulk density and powder fluidity of each sample was determined.

Table I sets forth the bulk density and powder fluidity of each of the untreated and treated polytetrafluoroethylene molding powders described in the foregoing examples. The bulk density was determined by placing about 35 cc. of powder into a first cylinder and allowing it to fall naturally from the first cylinder into a second cylinder. After removing excess powder by smoothing the top of the second cylinder with a straight-edge, the weight of the powder in the second cylinder was measured and the bulk density computed by dividing this weight by the volume.

The powder fluidity of each of the polytetrafluoroethylene powders was determined by the Daikin Kogyo Powder Fluidity Test, in which the powder was passed through a 10 mesh screen (except that a 30 mesh screen was used for the untreated polymer in Example I and II) and allowed to fall freely into a vertical glass cylinder 48 mm. in inside diameter and 140 mm. in height located with its upper edge 30 mm. below the screen. The flat bottom of this cylinder was made of polyvinyl chloride sheet, in the center of which was an aperture 18 mm. in diameter. The powder was allowed to fall freely into the cylinder until the pile of powder around the aperture of the bottom grew to its maximum stable height. The height of the powder then was measured at each of each points equally spaced about the cylinder circumference, and a mean value was obtained. Such measurements were repeated three times for each powder specimen, and the mean value of all measurements was taken as a measure of the fluidity of the powder. The resulting height measurement is inversely proportional to the fluidity of the powder. Thus, the lower the height of the underlying pile of powder, the higher the fluidity of the powder.

TABLE I.—EFFECT OF ROTATIONAL AND VIBRATIONAL TREATMENT ON THE BULK DENSITY AND POWDER FLUIDITY OF POLYTETRAFLUOROETHYLENE MOLDING POWDERS

| Example | Period of Treatment | Bulk Density (gram/cubic centimeter) | Powder Fluidity (millimeters) |
|---|---|---|---|
| I | Untreated | 0.22 | 39.5 |
|   | Treated for one hour | 0.23 | 29.8 |
|   | Treated for two hours | 0.24 | 23.3 |
| II | Untreated | 0.25 | 38.5 |
|   | Treated for one hour | 0.34 | 20.3 |
|   | Treated for two hours | 0.37 | 18.1 |
| III | Untreated | 0.44 | 24.7 |
|   | Treated for one hour | 0.56 | 18.2 |
|   | Treated for two hours | 0.58 | 15.2 |
| IV | Untreated | 0.60 | 23.8 |
|   | Treated for one hour | 0.71 | 12.1 |
|   | Treated for two hours | 0.75 | 10.3 |

The data summarized in Table I demonstrates the marked improvements in bulk density and powder fluidity which are obtained when polytetrafluoroethylene powders are subjected to uniform rotation and vibration in a rotary mixer (or similar equipment) in accordance with the invention. Microscopic examination of powders treated for 1 and 2 hours, respectively, confirmed that there was a marked decrease in the number of fiber-like particles, which decrease is believed to contribute to the increased bulk density and powder fluidity of the product.

Using the method of the present invention, we have been able to improve the polytetrafluoroethylene powder bulk density by 0.02 to 0.4 g./cc. and powder fluidity by 3 mm. to 30 mm. These results have been achieved without damaging the characteristics of the powder for molding purposes.

Polytetrafluoroethylene molding powders produced in accordance with the invention are quite satisfactory for use in any powder molding application in which a minimum number or even complete absence of voids is required.

We claim:

1. The method of improving the resistance to coalescence of polytetrafluoroethylene molding powders which comprises uniformly rotating and vibrating a polytetrafluoroethylene powder in a rotary mixer for a period of time sufficient (a) to smooth the particle surfaces without substantially decreasing particle size, (b) to increase the bulk density of the powder by at least 0.02 gram per cubic centimeter, and (c) to increase its fluidity, thereby improving the resistance to coalescence of the powder.

2. The method of improving the resistance to coalescence of polytetrafluoroethylene molding powders which comprises uniformly rotating and vibrating a polytetrafluoroethylene powder in a rotary mixer at a temperature in the range between about −10° C. to about 100° C. for a period of time sufficient (a) to smooth the particle surfaces without substantially decreasing particle size, (b) to increase the bulk density of the powder by at least 0.02 gram per cubic centimeter, and (c) to increase its fluidity, thereby improving the resistance to coalescence of the powder.

3. The method of improving the resistance to coalescence of polytetrafluoroethylene molding powders which comprises uniformly rotating and vibrating a polytetrafluoroethylene powder having a bulk density in the range between 0.15 to 0.9 gram per cubic centimeter in a rotary mixer at a temperature in the range between about −10° C. to about 100° C. for a period of time sufficient (a) to smooth the particle surfaces without substantially decreasing particle size, (b) to increase the bulk density of the powder by 0.02 to 0.4 gram per cubic centimeter, and (c) to increase its fluidity by from 3 to 30 millimeters, as determined by the Daikin Kogyo Powder Fluidity Test, thereby improving the resistance to coalescence of the powder.

4. The method of improving the resistance to coalescence of polytetrafluoroethylene molding powders which comprises uniformly rotating and vibrating a polytetrafluoroethylene powder having a particle size from 10 to 400 mesh (Tyler standard) and a bulk density in the range between 0.22 to 0.60 in a rotary mixer at a temperature in the range between about 10° C. to about 40° C. for a period of time sufficient (a) to smooth the particle surfaces without substantially decreasing particle size, (b) to increase the bulk density of the powder to between 0.23 and 0.75 gram per cubic centimeter, and (c) to increase its fluidity to from 10.3 to 29.8 millimeters, as determined by the Daikin Kogyo Powder Fluidity Test, thereby improving the resistance to coalescence of the powder.

5. Polytetrafluoroethylene molding powder characterized by improved resistance to coalescence and having a bulk density in the range from 0.23 to 0.75 gram per cubic centimeter, and a powder fluidity in the range from 10.3 to 29.8 millimeters as determined by the Daikin Kogyo Powder Fluidity Test, the polytetrafluoroethylene molding powder having been processed by uniformly rotating and vibrating the polytetrafluoroethylene powder for a period of time sufficient (a) to smooth the particle surfaces without substantially decreasing particle size, (b) to increase the bulk density of the powder, and (c) to increase its fluidity.

References Cited

UNITED STATES PATENTS 2,936,301    5/1960    Thomas et al. _____ 260—92.1

FOREIGN PATENTS 638,328    6/1950    Great Britain.

JOSEPH L. SCHOFER, *Primary Examiner.*

J. A. DONAHUE, *Assistant Examiner.*